June 20, 1939.  F. BRUNKE ET AL  2,163,393
SELENIUM RECTIFIER HAVING LIGHT METAL CARRIER ELECTRODES
Filed June 8, 1937
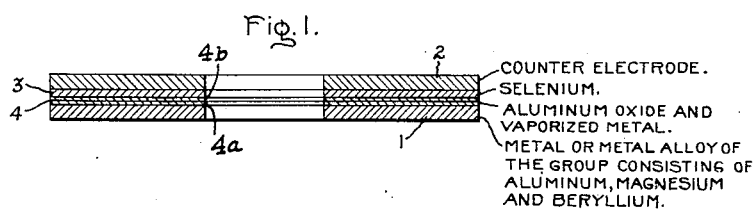
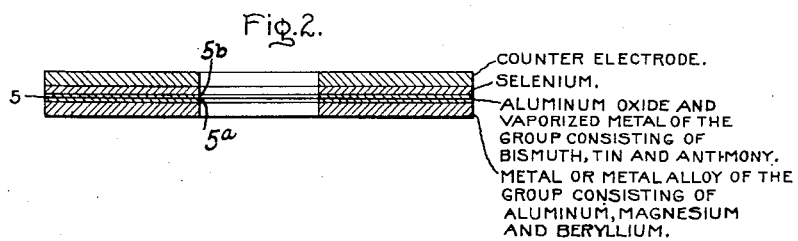
Inventors:
Fritz Brunke,
Werner Koch,
by Harry E. Dunham
Their Attorney.

Patented June 20, 1939

2,163,393

UNITED STATES PATENT OFFICE 2,163,393

SELENIUM RECTIFIER HAVING LIGHT METAL CARRIER ELECTRODES

Fritz Brunke, Berlin-Steglitz, and Werner Koch, Berlin-Glienicke-Nord, Germany, assignors to General Electric Company, a corporation of New York Application June 8, 1937, Serial No. 147,104
In Germany June 13, 1936

12 Claims. (Cl. 175—366)

Our invention relates to dry plate rectifiers and like devices such as light-sensitive cells, of the type having a light metal as the carrier or base electrode, and particularly to an improved method of producing selenium rectifiers and like devices having a light metal as the base electrode.

Rectifiers of the dry plate type which are in common use may be generally divided into two classes, the copper-oxide and the selenium, both having the same construction in principle, i. e., a base electrode or carrier electrode, a semi-conductor layer, and a counter electrode. In the case of the copper-oxide rectifier the base electrode is formed of copper, but in the case of the selenium rectifier and like devices such as the light-sensitive cell, iron, nickel-plated iron, or nickel is usually employed as material for the base electrode. Since the latter metals are relatively heavy, it follows that if a light metal could be employed satisfactorily as material for the base electrodes of the selenium elements, a very considerable saving of weight would be attained as compared with rectifiers having a base plate or electrode of the usual metals above mentioned.

Difficulties have been encountered, however, in the attempt to manufacture selenium rectifiers and like devices having base or carrier electrodes of light metal such as aluminum. If, for example, the selenium in its form required for the rectifying effect, is applied to the aluminum or similar light metal in the conventional manner heretofore employed, for example by melting of the selenium, the selenium layer then being provided in the usual way with a counter-electrode, a rectifier will result which is of relatively low efficiency. With rectifiers thus constructed, it has been found that it was possible to obtain, when a voltage of one volt was applied across the rectifier cell, a current of only one-tenth of a milliampere per square centimeter of area in the forward direction through the cell, the current in the blocking or reverse direction being one tenth of this amount. The rectification factor, i. e., the ratio of the current in the forward direction to the current in the reverse direction thus amounted only to ten to one, and was, therefore, much lower than in the case of the above-mentioned conventional selenium rectifier having iron, or nickel base electrodes.

Further, the current load to which the selenium rectifier, formed as above set forth by applying selenium to a light metal such as aluminum but in accordance with the methods heretofore employed, could be subjected was relatively small.

It has been found that the reason for the lower efficiency of the selenium rectifier thus constructed lay in the fact that when employing the former methods of applying the selenium to the carrier electrode, a blocking layer develops between the carrier electrode and the selenium due to the oxide film with which the aluminum or similar light metal is normally covered.

In accordance with our invention the above difficulties are obviated, and the advantages incident to the employment, as base or carrier electrodes, of light metals such as aluminum, are retained, by subjecting the carrier electrode to a process which renders the oxide film thereon conductive.

Our invention will be better understood from the following description when considered in connection with the accompanying drawing and its scope will be pointed out in the appended claims.

Referring to the drawing, Figs. 1 and 2 are cross sectional views of selenium rectifier cells or elements having light-metal base or carrier electrodes treated in accordance with the method of my invention.

In Fig. 1 the rectifier or like cell or element comprises a base or carrier electrode 1 of a light metal, for example, a metal of the group including aluminum, magnesium and beryllium or an alloy of metals of this group, a counter electrode 2 of a suitable metal, and, between the base electrode and counter electrode a semi-conductor layer 3 of selenium or comprising selenium. Between the selenium layer 3 and the base or carrier electrode 1 is a thin layer, designated by the numeral 4, the composition and formation of which will be described hereinafter.

It is known that in certain cases in the forming of selenium rectifiers of the usual type having iron or nickel carrier electrodes, a blocking layer occurs on the selenium and between the selenium layer and the counter electrode, so that the rectifier then blocks the current not only in the desired reverse direction but in both directions. It is further known, however, that if the formation of the above-described blocking layer on the selenium is prevented by a process involving a vaporizing of the surface of the carrier electrode metal in vacuo, it is possible to obtain for the rectifier a rectification factor of 1:200.

We have found that the light metals can be employed as carrier electrodes for the selenium type of rectifier, while at the same time this rectifier type retains all of its advantages inherent in the conventional type, by treating in a suitable manner the oxide film which forms on the light metal surface. In accordance with our invention, a vaporizing process is employed for the purpose, the surface of a carrier electrode of a light metal, for example aluminum, being exposed to suitable finely divided metal or preferably to suitable metal vapors. An effect is thereby obtained which is analogous to the "decolorization" of certain crystals under the influence of metal vapors. The metal penetrates into the oxide film of the aluminum or other light metal surface, which during the process is preferably heated, and renders the film sufficiently conductive, the oxide film 4a and the metal 4b by which it is penetrated then forming the layer 4, of Fig. 1, and oxide film 5a and finely divided metal 5b forming the layer 5 of Fig. 2. Although layer 4 is shown for clearness as of considerable thickness, it will be understood that in actual practice of the process so little metal is applied to the oxide film that no visible layer results. After the process is completed the layer of oxide retains its former advantages, i. e., there remains, as before the application of the vaporized metal to the oxide, both the effective adhesion of the selenium layer 3 to the carrier electrode 1, and the desired lack of chemical action between the selenium and the aluminum or other light metal oxide.

It will be noted that electrolytic processes for the application of the metal to the oxide, which result in instability of the rectifier, are precluded. When the thicker metal coatings are employed, which result especially from the electrolytic processes, the aluminum or other light metal remains entirely ineffective electrically as a carrier electrode, the applied metal coating becoming in effect the carrier electrode. Metal coatings produced on the oxide in this latter manner have a tendency to loosen and strip off, because of the oxide film which lies beneath the relatively thick metal layer.

The "coloring" of the oxide film in accordance with the invention, as the metal treatment of the light metal surface may be termed, analogously to the term used in connection with alkali halogen crystals, is produced, for example, in the following manner: the aluminum or other light metal oxide film is exposed, in vacuo, to metal in finely divided form or to vaporized metal, for such a period of time and at such a temperature that a layer of oxide and metal results which is sufficiently conductive but which at the same time continues to function, in the same manner as does the oxide film alone, to enhance the adhesion of the selenium layer to the carrier electrode and to lessen or to prevent chemical action between the selenium and the oxide. Preferably the oxide film is thus exposed for a relatively short time, the temperature during the process being of the order of 100° C. and preferably above this limit. We have found that while not all metals produce the same favorable effect when employed as above described to penetrate the oxide film, a considerable number of metals are useful. We have found further that a very high degree of effectiveness for the purpose described is obtained by the employment of bismuth, and that equally good results are obtained also with tin and antimony. Fig. 2 shows a rectifier cell in which a layer 5 of oxide and metal is formed by the use of one of the metals of the group including the latter three metals.

Rectifier cells produced in the manner above indicated and as illustrated in Figs. 1 and 2 are found to have a rectification factor, with a voltage of 1 volt impressed across the cell, of 1:3000.

The process in accordance with our present invention has been described in connection with rectifiers having a semiconduction layer which is formed of selenium. The process may, however, under proper conditions, be applied to rectifiers in which the semiconductive layer is formed of other materials.

We have found, further, that the above-described process, including the application to the light metal oxide film of a finely divided metal or of metal in vaporized form, is improved by exposing the oxidized surface of the light metal carrier electrode to a bombardment of positive ions. The ions of various metals may be used for this purpose. For example, ions from metals of the group including bismuth, tin and antimony may be employed, which are caused to penetrate into the light metal oxide layer and which render this layer conductive. Further, we have found that ions of the semiconductive material, for example selenium, which is subsequently applied to the base or carrier electrode, may be employed for the above purpose. It is, further, found advantageous in certain cases to bombard the oxide film with ions of a reducing vapor or gas, for example, hydrogen.

Our invention has been described herein in particular embodiments for purposes of illustration. It is to be understood, however, that the invention is susceptible of various changes and modifications and that by the appended claims we intend to cover any such modifications as fall within the true spirit and scope of our invention.

What we claim as new and desire to secure by Letters Patent of the United States is:

1. The method of producing a dry plate element of the selenium type which includes providing a counter electrode and a carrier electrode composed of a light metal having an oxide film thereon, exposing said oxide film in vacuo to a finely-divided metal to form a thin layer of said finely divided metal on said film, applying a layer comprising selenium to said layer of finely divided metal, and applying said counter electrode to said layer comprising selenium.

2. The method of producing a dry plate element of the selenium type which includes providing a counter-electrode and a light metal carrier electrode having an oxide film thereon, exposing said oxide film in vacuo and at a temperature of above 100° C. to a vaporized metal to form a thin layer of said vaporized metal on said film, applying a layer comprising selenium to said layer of vaporized metal, and applying said counter electrode to said layer comprising selenium.

3. The method of producing a dry plate element of the selenium type which includes providing a counter electrode and a carrier electrode composed of a light metal oxidized on the surface thereof, exposing the oxidized surface of said carrier electrode in vacuo to vaporized bismuth to form a thin layer of bismuth on said surface, applying a layer comprising selenium to said layer of bismuth, and applying said counter electrode to said layer comprising selenium.

4. The method of producing a dry plate element of the selenium type which includes providing a counter electrode and a carrier electrode composed of light metal oxidized on the surface thereof, exposing said oxidized surface in vacuo to vaporized tin to form a thin layer of tin on said surface, applying a layer comprising selenium to said layer of tin, and applying said counter electrode to said layer comprising selenium.

5. The method of producing a dry plate element of the selenium type which includes providing a counter electrode and a carrier electrode composed of a light metal oxidized on the surface thereof, exposing said oxidized surface in vacuo to vaporized antimony to form a thin layer of antimony on said surface, applying a layer comprising selenium to said layer of antimony, and applying said counter electrode to said layer comprising selenium.

6. The method of producing a dry plate element of the selenium type which includes providing a counter electrode and a carrier electrode composed of a material having an oxide film thereon and of the group comprising aluminum, magnesium and beryllium and alloys of said metals, exposing in vacuo said oxide film to a vaporized metal of the group comprising bismuth, tin and antimony to form a thin layer of metal of said last-named group on said film, applying a layer comprising selenium to said last-named layer, and applying said counter electrode to said layer comprising selenium.

7. The method of producing a dry plate element of the selenium type which includes providing a counter electrode and a carrier electrode composed of a light metal oxidized on the surface thereof, exposing said oxide film in vacuo to the bombardment of ions of a metal, exposing said film in vacuo to a finely divided metal to form a thin layer of said finely divided metal on said film, applying a layer comprising selenium to said last-named layer, and applying said counter electrode to said layer comprising selenium.

8. The method of producing a dry plate element of the selenium type which includes providing a counter electrode and a carrier electrode composed of a material having an oxide film thereon and of the group comprising aluminum, magnesium and beryllium and alloys of said metals, exposing said oxide film to the bombardment of ions of the metal group comprising bismuth, tin and antimony, exposing said film in vacuo to a finely divided metal to form a layer of said finely divided metal on said film, applying a layer comprising selenium to said last-named layer, and applying said counter electrode to said layer comprising selenium.

9. The method of producing a dry plate element of the selenium type which includes providing a counter electrode and a carrier electrode composed of a material having an oxide film thereon and of the group of comprising aluminum, magnesium and beryllium and alloys of said metals, exposing said oxide film to the bombardment of ions of the metal group comprising bismuth, tin and antimony, exposing said film in vacuo to a finely divided metal to form a thin layer of said finely divided metal on said film, applying a layer comprising selenium to said last-named layer, and applying said counter electrode to said layer comprising selenium.

10. The method of producing a dry plate element of the selenium type which includes providing a counter electrode and a carrier electrode composed of material having an oxide film thereon and of the group comprising aluminum, magnesium, and beryllium and alloys of said metals, exposing said oxide film to the bombardment of ions of a reducing medium, exposing said film in vacuo to a finely divided metal to form a thin layer of said finely divided metal on said film, applying a layer comprising selenium to said last-named layer, and applying said counter electrode to said layer comprising selenium.

11. A dry plate element including a carrier electrode composed of a material of the group comprising aluminum, magnesium and beryllium and alloys of said metals, a semi-conductive layer comprising selenium, a layer between said carrier electrode and said semi-conductive layer comprising a finely divided metal of the group comprising bismuth, tin, and antimony and an oxide of that one of said first-named group of materials which composes said carrier electrode, the oxide portion of said last named layer being in contact with said carrier electrode and the finely divided metal portion of said last-named layer being in contact with said semi-conductive layer, and a counter electrode in contact with said semi-conductive layer.

12. A dry plate element including a carrier electrode composed of a material of the group comprising aluminum, magnesium and beryllium and alloys of said metals, a semi-conductive layer comprising selenium, a layer between said carrier electrode and said semi-conductive layer comprising an oxide of that one of said first-named group which composes said carrier electrode and a finely divided metal of the group comprising bismuth, tin, and antimony, the oxide portion of said last named layer being in contact with said carrier electrode and the finely divided metal portion of said last-named layer being in contact with said semi-conductive layer, and a counter electrode in contact with said semi-conductive layer.

FRITZ BRUNKE.
WERNER KOCH.